United States Patent [19]

Gilbert

[11] Patent Number: 4,532,646

[45] Date of Patent: Jul. 30, 1985

[54] X-RAY FOCAL SPOT LOCATING APPARATUS AND METHOD

[75] Inventor: Hubert W. Gilbert, Cedar Crest, N. Mex.

[73] Assignee: The United States of America as represented by the Department of Energy, Washington, D.C.

[21] Appl. No.: 504,905

[22] Filed: Jun. 16, 1983

[51] Int. Cl.[3] .............................................. G01D 18/00

[52] U.S. Cl. ..................................... 378/207; 378/149; 250/505.1

[58] Field of Search ...................... 250/505.1; 378/147, 378/149, 154, 205, 207

[56] References Cited

U.S. PATENT DOCUMENTS

| | | | |
|---|---|---|---|
| 3,013,157 | 12/1961 | Norton | 378/207 |
| 3,222,524 | 12/1965 | Lee | 378/149 |
| 3,412,246 | 11/1968 | Horwitz . | |
| 3,886,367 | 5/1975 | Castle . | |
| 3,928,767 | 12/1975 | Röeck | 378/207 |
| 3,943,366 | 3/1976 | Platz et al. | 378/149 |
| 3,947,687 | 3/1976 | Fenstermacher . | |
| 3,950,651 | 4/1976 | Flocée . | |
| 4,228,356 | 10/1980 | Cushman | 378/168 |
| 4,288,697 | 9/1981 | Albert . | |

OTHER PUBLICATIONS

K. Nishizawa, "Alignment of X-ray Tube Focal Spots for Spectral Measurement," Med. Phys. 9(2), Mar.-/Apr. 1982, pp. 284-287.

*Primary Examiner*—Alfred E. Smith
*Assistant Examiner*—Charles Wieland
*Attorney, Agent, or Firm*—George H. Libman; Albert Sopp; Judson R. Hightower

[57] ABSTRACT

An X-ray beam finder for locating a focal spot of an X-ray tube includes a mass of X-ray opaque material having first and second axially-aligned, parallel-opposed faces connected by a plurality of substantially identical parallel holes perpendicular to the faces and a film holder for holding X-ray sensitive film tightly against one face while the other face is placed in contact with the window of an X-ray head.

9 Claims, 5 Drawing Figures

X-RAY FOCAL SPOT LOCATING APPARATUS AND METHOD

The United States Government has rights in this invention pursuant to Contract No. DE-AC04-76DP000789 between the Department of Energy and Sandia Corporation.

BACKGROUND OF THE INVENTION

The present invention relates generally to a focal point locator for a point source and more particularly to a beam finder for calibrating X-ray equipment.

An X-ray head commonly presents the operator with a visually opaque plastic lens through which X-rays are transmitted from a point source anode located behind the plastic lens inside the head. To minimize stray X-ray propagation outside the head, and to maximize the efficiency of the X-ray source, it is desirable to collimate the output by placing a lead shield over the plastic lens and providing a single hole through the shield at the focal point of the X-ray head. One method of determining the focal point involves the use of a multi-pinholed lead plate of one millimeter thickness, an x-y mechanical stage, a transparent methacrylate plate, a film cassette and a telescope. The invention provides the same measurement in a much less complicated manner.

SUMMARY OF THE INVENTION

It is an object of this invention to provide a compact, easy-to-use, X-ray beam finder.

It is another object of this invention to provide an X-ray beam finder including a plurality of parallel holes through which film may be exposed.

It is a further object of this invention to provide an X-ray beam finder which may be taken to an X-ray head and easily used by relatively unskilled personnel.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the X-ray beam finder of this invention may comprise a mass of X-ray opaque material having two axially-aligned, parallel-opposed faces connected by a plurality of substantially identical holes extending perpendicularly between the surfaces and a film holder for holding X-ray sensitive film tightly against one of the opposed faces, the film beam exposed through the holes when the other face is mounted against an X-ray head.

BRIEF DESCRIPTION OF THE DRAWINGS

The accompanying drawings, which are incorporated in a form a part of the specification, illustrate an embodiment of the present invention and, together with the description, serve to explain the principles of the invention.

DETAILED DESCRIPTION OF THE INVENTION

Figure 1:
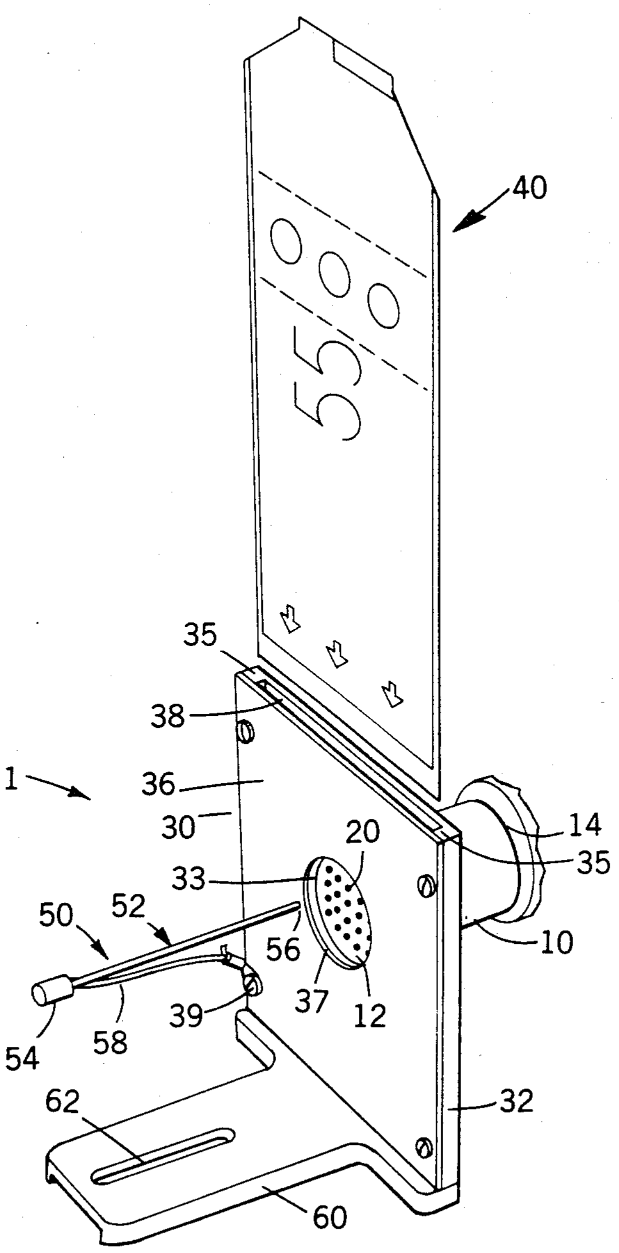
FIG. 1 is an oblique view of the invention in combination with an X-ray head.

As shown in FIG. 1, an X-ray beam locator in accordance with a preferred embodiment of the invention includes mass 10 which is connected at one end 12 to film holder 30. The invention also may include a base 60 for supporting the device, a probe 50 and film 40 as described hereinafter.

Figure 2:
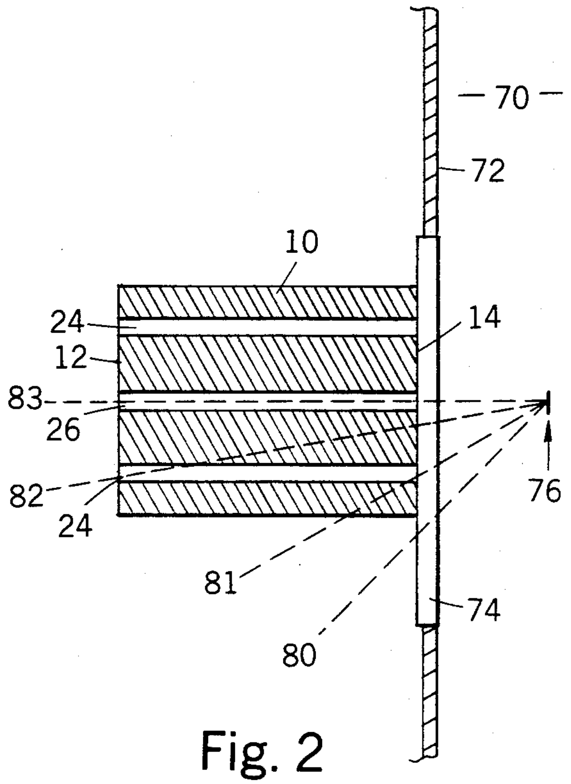
FIG. 2 illustrates the operation of the invention.
Figure 3:
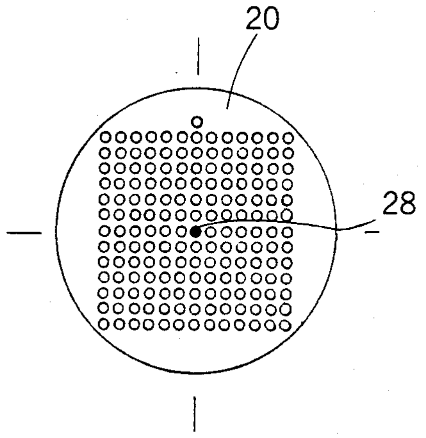
FIG. 3 shows a plan view of a portion of the invention.

As shown in FIGS. 1–3, mass 10 is a solid piece of relatively X-ray opaque material having parallel and opposed first surface 12 and second surface 14 connected by a plurality of parallel holes 20 extending perpendicular to each surface. As shown in FIG. 3, holes 20 are preferably arranged in a maximum density-minimum diameter (md-md) pattern across a portion of surfaces 12 and 14. By md-md pattern it is meant that the holes are made as small as possible and as close to one another as possible without compromising the integrity of the wall between adjacent holes. A wall-to-wall spacing equal to one-half the hole diameter was the smallest spacing achieved in tests of the invention.

Referring again to FIG. 1, film holder 30 preferably may comprise a first aluminum sheet 32 having a hole 33 equal in size and shape as the outer contour of mass 10 at first surface 12, allowing mass 10 to be affixed to film holder 30 through first sheet 32. Film holder 30 further comprises a second sheet 36 spaced from first sheet 32 by at least two spacers 35, thereby forming a slot 38. As shown, film holder 30 may be constructed of aluminum pieces fastened together by screws 39. Second sheet 26 also includes a second hole 37 permitting access to first surface 12 as explained hereinafter.

Also shown in FIG. 1 is base 60 which includes tripod slot 62 for mounting the invention to a standard tripod. In addition, probe 50 including rod 52 having a diameter slightly smaller than the diameter of each hole in pattern 20 and a handle 54 is fastened to the device by cord 58.

The operation of the device is best understood by reference to FIG. 2 which shows a schematic representation of a portion of an X-ray head having a cut-away mass 10 in contact therewith. To simplify the picture, only a few of the many holes in mass 10 are shown in FIG. 2. X-ray head 70 typically comprises a metal wall 72 having a X-ray transparent but visible-light opaque window 74 for the emission of X-rays from an anode 76 located within head 70. X-rays 80 emitted from anode 76 propagate in all directions, those passing through window 74 being emitted from the X-ray head. However, only X-rays along beam 83 perpendicular to window 74 are truly collimated, and only these X-rays will pass without attenuation to surface 12. The invention enables the user to locate the spot on the window where the collimated X-rays are emitted, in order that he may place a lead sheet entirely over window 74 except for a hole which permits the passage only of X-rays 83.

To determine the location of X-rays 83, mass 10 is placed with second surface 14 tightly against window 74 of X-ray head 70 as shown in FIG. 2. A piece of photographic film 40 is placed against first surface 12 of mass 10 and the X-ray head is excited. X-rays 83 propagate directly through hole 26 to record a bright image on film 55. However, X-ray 82 is attenuated by mass 10 before exiting hole 24. Therefore, X-ray 82 provides a much diminished image upon film 40. X-rays 80 and 81 bypass mass 10 and film 40 completely and are not part of this measurement.

Figure 4A:
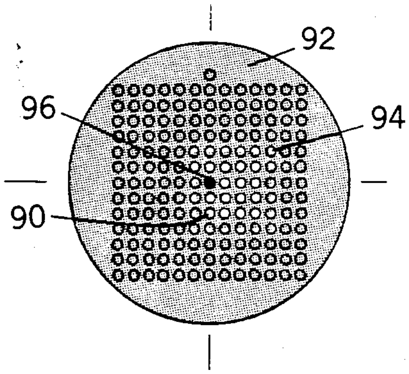
FIGS. 4*a* and 4*b* show test results from two different versions of the inventions.
Figure 4B:
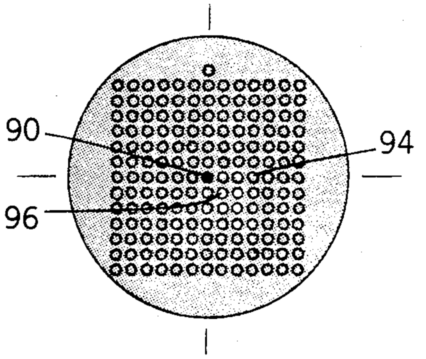

FIGS. 4A and 4B show the exposures obtained from two masses 10 having a spacing between first surface 12 and second surface 14 of one and two inches, respectively. In these figures, cross-hatched portion 92 represents the dark image on film 40 caused by attenuation of X-rays passing through mass 10. Shadowed spots 94 are caused by X-rays 82 of FIG. 2. Clear spots 90 are caused by the minimally attenuated X-rays 83 of FIG. 2. Dark spot 96 is caused by filling the center hole 28 with solder to provide a reference point on film 40.

The one-inch mass provided a 4×4 matrix of white spots 90, thereby locating anode 76 within a ⅛ inch square of window 74. The two-inch mass provided a 2×2 matrix of white spots 90, thereby locating anode 76 within a 1/16 inch.

For the tests of FIGS. 4*a* and 4*b*, mass 10 was a cylinder having a diameter of 1.75 inches and hole pattern 20 included a 13-by-13 hole matrix of 0.059" holes having a center-to-center separation of 0.083 inches. In order to keep these holes parallel while maintaining the required spacing over the two-inch length of the holes, the two embodiments of the device were manufactured first by carefully drilling a one-piece mass 10 and later by using a computer-guided drill to machine a plurality of identical 0.25-inch thick pieces which were pinned together to form mass 10.

The film for these experiments was Polaroid type 55 4×5 inch sheet film. Slot 38 was sized to permit the snug passage of one sheet of this film. The exposure was made without removing the cover sheet which prevents visual light from exposing the film. After X-ray exposure, the film was processed in a Polaroid sheet film attachment for a 4×5 camera in normal manner. When the focal spot has been determined as a result of a picture such as shown in FIG. 4*b*, end 56 of probe 50 is marked with wet paint and the probe is pushed through the appropriate hole 26 of mass 10 to leave a mark on the face of window 74. The invention is then removed from window 74, the position of the mark ascertained, and a lead collimator constructed with a hole at that position.

The lead collimator serves to provide a beam of X-rays only over the surface of an object under test located 4 to 10 feet from head 70. Typically, a ½ inch hole is used in the collimator which must be centered over the focal spot.

It is noted that marked hole 96 also may be formed by drilling hole 96 to a slightly larger diameter over half its length, yielding a noticeable shadow on film 40.

The particular sizes and equipment discussed above are cited merely to illustrate a particular embodiment of this invention. It is contemplated that the use of this invention may involve components having different sizes and shapes as long as the principal, using a mass having collimated maximum density holes with a film holder at one end, is followed. For example, the invention can also be used to locate the focal spot of a neutron source if a neutron-opaque plastic mass 10 is used. A device constructed in accordance with these teachings will provide a convenient, simple, accurate gauge for locating the focal point of a beam-generating head. It is intended that the scope of the invention be defined by the claims appendent hereto.

I claim:

1. A beam finder for locating and marking the focal spot of a beam generator comprising:

a mass of material relatively opaque to the generated beam, said mass having first and second axially-aligned, parallel-opposed faces connected by a plurality of substantially identical parallel holes extending perpendicular to said faces through said mass, the minimum distance between said faces being at least twenty-five times the average diameter of said holes;

film holder means for holding beam sensitive film tightly against said first opposed face; whereby said second opposed face is mounted against a beam generator and film is exposed through said holes, the focal spot of the generator being indicated on the film by the outline of the hole having the greatest exposure; and probe means for marking the beam generator through the beam finder hole through which the focal spot was indicated on said film.

2. The beam finder of claim 1 wherein said beam consists of X-rays.

3. The beam finder of claim 2 wherein said mass consists of a metal cylinder having a circular cross-section.

4. The beam finder of claim 3 wherein said metal is brass.

5. The beam finder of claim 3 wherein said film holder comprises a first sheet of material having a hole for said mass affixed to said mass to extend said first opposed face;

a second sheet of material mounted in spaced relationship to said first sheet, said space between sheets being approximately equal to the thickness of a film.

6. The beam finder of claim 2 wherein said plurality of holes forms a maximum density-minimum diameter pattern across a portion off each parallel-opposed face.

7. The beam finder of claim 6 wherein the minimum wall-to-wall spacing between holes is approximately one-half the diameter of the holes.

8. The beam finder of claim 1 wherein said probe means comprises:

a rod having a diameter slightly smaller than the diameter of each hole and a length greater than the length of each hole, wherein one end of said rod may be marked with wet paint to leave a mark on the beam generator.

9. A method of finding and marking the focal spot of a generating tube comprising the steps of:

placing a beam finder against the generating tube, said beam finder comprising:

a mass of material relatively opaque to the generated beam, said mass having first and second axially-aligned, parallel-opposed faces connected by a plurality of substantially identical parallel holes extending perpendicular to said faces through said mass, the minimum distance between said faces being at least twenty-five times the average diameter of said holes;

beam sensitive film; and film holder means for holding said film tightly against said first opposed face;

exposing said film to the output of said generating tube through said beam finder;

removing and processing said film; and marking the beam generator by passing a probe through the beam finder hole through which said film received the greatest exposure.

* * * * *